United States Patent [19]

Anton et al.

[11] Patent Number: 4,837,077
[45] Date of Patent: Jun. 6, 1989

[54] HYDROEXPANSIBLE COMPOSITE MATERIAL, THE PREPARATION THEREOF AND A COMPOSITION FOR ITS IMPLEMENTATION AS WELL AS THE USES THEREOF

[75] Inventors: Patrice Anton, Barentin; Denis Bergaentzle, Halluin, both of France

[73] Assignees: Intissel, Watterlos; Novacel, Deville Les Rouen, both of France

[21] Appl. No.: 877,257

[22] Filed: Jun. 23, 1986

[51] Int. Cl.$^4$ .......................... B32B 5/30; B32B 33/00; H01B 7/28; H01B 17/50

[52] U.S. Cl. ........................................... 428/240; 47/1; 47/1.5; 47/26; 47/48.5; 156/53; 174/23 C; 174/107; 174/118; 174/120 C; 174/120 SR; 174/121 B; 174/121 SR; 252/8.6; 252/8.8; 252/8.9; 252/510; 252/511; 350/96.29; 427/121; 427/389.9; 428/243; 428/244; 428/283; 428/294; 428/326; 428/327; 428/481; 428/485; 428/913; 502/402; 502/404; 604/364; 604/375; 604/376

[58] Field of Search ............... 428/913, 283, 326, 327, 428/240, 243, 244, 294; 174/107, 118; 252/510, 511; 427/121, 389.9; 502/402, 404

[56] References Cited

U.S. PATENT DOCUMENTS

| | | | |
|---|---|---|---|
| 4,381,782 | 5/1983 | Magurds et al. | 428/283 |
| 4,413,995 | 11/1983 | Korpman | 428/283 |
| 4,467,015 | 8/1984 | Clem | 428/454 |
| 4,469,746 | 9/1984 | Weisman et al. | 428/283 |
| 4,600,462 | 7/1986 | Watt | 428/913 |
| 4,656,062 | 4/1987 | Harriet | 428/283 |

FOREIGN PATENT DOCUMENTS

| | | |
|---|---|---|
| 2007163 | 9/1971 | Fed. Rep. of Germany . |
| 2311392 | 12/1976 | France . |
| 153893 | 3/1986 | Norway . |
| 1389961 | 4/1975 | United Kingdom . |
| 2080998 | 2/1982 | United Kingdom . |

*Primary Examiner*—James C. Cannon
*Attorney, Agent, or Firm*—Larson and Taylor

[57] ABSTRACT

The invention relates to a hydroexpansible composite material, the method of preparing same and a composition for implementing this method, as well as to the uses thereof. The composite material includes a solid flat support having, on at least one of its faces, a coating with a high proportion of a hydroexpansible polymer powder fixed to the support by means of a hydrosoluble binder, the coating being essentially formed of:

95 to 55% by weight of hydroexpansible polymer powder;

5 to 23% by weight of hydrosoluble binder; and 0 to 22% by weight of surfactant.

This hydroexpansible material may advantageously be used in medicine, surgery agriculture and especially as sealing agent in cables, particularly electric cables.

FIG. 2 shows how, in a cable, this material (11, 13) forms a sealing ring (13) about the point of infiltration of the water, thus preventing its longitudinal propagation.

27 Claims, 1 Drawing Sheet

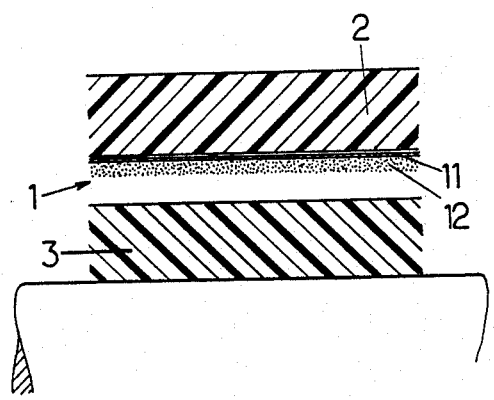
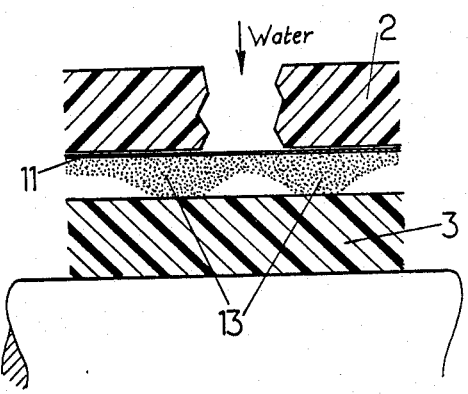
FIG.1. FIG.2.
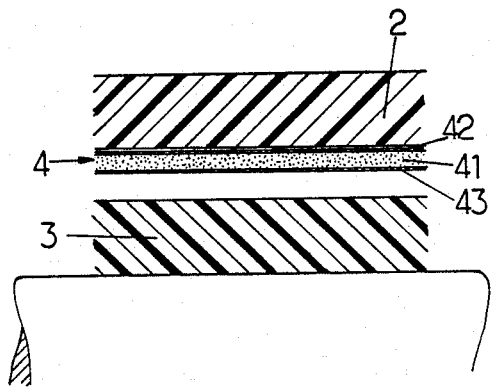
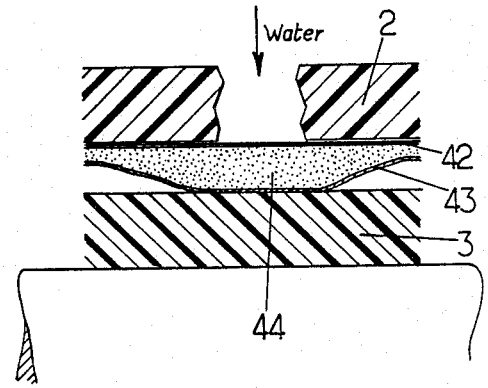
FIG.3. FIG.4.

HYDROEXPANSIBLE COMPOSITE MATERIAL, THE PREPARATION THEREOF AND A COMPOSITION FOR ITS IMPLEMENTATION AS WELL AS THE USES THEREOF

The invention relates to a composite material capable of swelling, without appreciably dissolving, in the presence of water or aqueous solutions.

More precisely, the invention relates to a composite material formed essentially of a flat solid support having on at least one of its faces, a coating comprising a high proportion of a polymer powder capable of swelling in the presence of water or aqueous solutions, a method for the manufacture of this composite material, a composition for implementing this method, and the uses of this composite material.

Composite materials are already known which are capable of swelling, without appreciably dissolving in the presence of water. Such materials are generally used in the electric cable industry. They are then introduced, in the form of a ribbon, into the sheath of the cable so as to ensure its longitudinal sealing while forming, by swelling, a plug when water enters accidentally into the cable either through its ends or through a perforation of the sheath, thus preventing the water from propagating inside the cable.

Among ribbons of this type, there may be mentioned the one which is made available by the Firm Freudenberg, Weinheim, G. F. R., under the name VILEDON-FIBREX and the references known at present K3310, K3312, K3313 and 3303C and that which is made available by the Firm First, Veenendaal, Netherlands under the references known at the present time, 3C 115, 3C 116, 3E 113, 3E 114, 3E 115 and 3E 116, to which reference is made in FR Pat. No. 81 02863.

These ribbons are formed essentially of a hydroexpansible polymer powder "sandwiched" between two layers of nonwoven material.

Cohesion of the composite is obtained by incorporating a thermoplastic substance (powder, fiber or other) in the hydroexpansible polymer powder. Under the combined action of pressure and heat, the thermoplastic substance softens, becomes sticky and thus ensures cohesion of the composite. During this sticking action, the thermoplastic substance causes an unfavorable effect: the blockage of a part of the hydroexpansible polymer powder, thus limiting its ability to swell in the presence of water.

According to the invention, it has now been found that the properties of such a composite material could be considerably increased while simplifying its structure by replacing the thermoplastic substance of the composites of the prior art by a hydrosoluble binder. The invention has as object, among other things, the composite material thus obtained.

The invention has more particularly as object a composite material including essentially a solid flat support having, on at leat one of its faces, a coating comprising a high proportion of a hydroexpansible polymer powder, characterized in that the hydroexpansible polymer powder is fixed on the support by means of a hydrosoluble binder, preferably in the presence of a surfactant, and in that the coating is essentially formed of:

95 to 55% by weight of hydroexpansible polymer powder;
5 to 23% by weight of hydrosoluble binder; and
0 to 22% by weight of surfactant.

Such a material enables water to be held at the place where it is introduced and therefore presents numerous applications.

Thus, it may be used as sealing ribbon in cables, particularly electric cables, but also in agriculture as a germination activator or for the transplantation of young shoots or in medicine or surgery as "sponge".

The support for this material is chosen essentially depending on the contemplated application.

It may be formed more particularly of a non-woven material, a textile material, paper or a plastic material. For most applications, particularly in the energy transport cable, telecommunications or optical fiber industries, it is preferably flexible.

The coating may if desired be covered with a film of material through which the water may pass, particularly a nonwoven web. However, at least in most applications, the presence of such a film is not necessary and complicates the manufacture and the cost of the composite material without adding thereto any advantage.

The hydroexpansible polymer may be formed of any polymer or mixture of polymers compatible with the support and the contemplated application and capable of swelling considerably in the presence of water or aqueous solutions by "storing" same, while being insoluble therein, that is to say having a solubility in these liquids less than 5%.

Advantageously, the hydroexpansible polymer is chosen so that it is capable of absorbing at least 15 times its own weight of water.

The hydroexpansible polymer may be chosen more particularly from the modified acrylic polymers, grafted starches, polyacrylamides, carboxymethylcellulose and its derivatives and advantageously in a general way from the polymers corresponding to the definition of "super-absorbents", that is to say the polymers "insoluble" (in the above mentioned meaning) in the fluids which they absorb and absorbing at least 15 times their own weight of water or non aqueous solution.

As superabsorbent polymers may be mentioned by way of indication but in no wise limitatively:

the acrylic polymer made available by the Firm JAPAN CATALYTIC CHEMICAL under the name AQUALIC;

the acrylamide polymer made available by the Firm CYANAMID under the name HYDROBLOCK;

the carboxymethylcellulose polymer made available by the Firm HERCULES under the name AQUA-SORB;

the starch/polyacrylic acid polymer obtained by grafting and made available by the Firm LION under the name LION-POLYMER; and the sodium polyacrylate polymer made available by the Firm GRAIN PROCESSING under the name WATER-LOCK J.

The hydrosoluble binder is chosen from the hydrosoluble agents capable of fixing the chosen polymer powder on the chosen support, without substantially modifying their physico-chemical properties.

Among the binders which may be advantageously used according to the invention there may be mentioned by way of non limitative examples:

the polyvinylpyrrolidones made available by the Firm GAF, under the trade names PVP K 30 and PVP K 90;

the polyvinylpyrrolidones and vinylpyrrolidonevinyl acetate copolymers made available by the Firm BASF (GFR) under the trade names of LUVISKOL K 30-K 90; and the hydroxypropylcelluloses made available by the Firm HERCULES (USA) under the trade names KLUCEL H, M, G, J, L and E.

Although the presence of a surfactant is not indispensable, it has been found that it plays a favorable role, particularly for ensuring a good preservation of the coating paste and facilitating the coating operation upon manufacture of the composite material.

As surfactant it is preferable to use an anionic or non ionic surfactant.

Among the surfactants which may be used according to the invention may be mentioned by way of non limitative examples:

the product made available by the Firm Rohm and Haas (USA) under the trade names of Triton X 100 and Triton GR 5M;

the product made available by the Firm BYK-MALLINCKRODT under the name ANTI-TERRA-U;

the product made available by the Firm PETROCHEMICALS CO., INC. under the name MORWET EFN;

the products made available by the Firm AIR PRODUCTS under the name SURFYNOL; and the product made available by the Firm BASF (GFR) under the name Leophen RA.

The coating has a thickness preferably between 10 and 1000μ.

For use as sealing agent in the electric cable industry for transporting medium and high tension energy, it is advantageous to make the composite material conducting, so as to obtain an acceptable conductibility in its thickness and on its surface.

Usually, for this, the solid flat support is previously charged with a material for obtaining a surface and transverse resistance adapted to the type of cable (in general between 8 and 20 g/m$^2$ of conducting carbon black is sufficient; they are introduced into the support during the manufacture thereof).

The composite material on the invention may, as well be seen further on, be manufactured by coating the support with a paste. This paste, this is one of the advantages of that method, may contain a conducting carbon black in a quantity such that the hydroexpansible coating obtained contains preferably between 2 and 8 g/m$^2$ of carbon black. This facility avoids the so called "biface" effect and so allows homogeneous conductivities to be obtained on each of the faces and in the thickness.

The invention has then as further object a composite material such as defined above for use as sealing agent in electric cables for transporting medium and high tension energy, characterized in that its coating further comprises from 2 to 8 g/m$^2$ of conducting carbon black.

The composite material of the invention may be manufactured essentially by coating the support on at least one of its faces with a paste comprising the chosen hydroexpansible polymer powder, hydrosoluble binder and surfactant in the proportions contemplated for the coating, as well possibly as other additives and/or carbon black, homogenized by means of a liquid other than water and subsequent evaporation of the liquid.

The coating may be obtained by means of a conventional coating device comprising particularly a reservoir for the paste and drive and scraper rollers for the support, such as that known under the name of scraper roller.

The evaporation of the liquid may be conducted in a drier, for example of the pulsed hot air type.

The purpose of the liquid used is to disperse the hydroexpansible polymer and the different additives required so as to obtain a paste whose consistency (viscosity) and homogeneity make the coating operation possible without at this stage causing expansion of the hydroexpansible polymer. It may be advantageously chosen from the light alcohols of the methanol or ethanol type.

The invention further relates to a coating paste for manufacturing the composite material of the invention, characterized in that it comprises essentially, by weight:

57 to 16.5% of hydroexpansible polymer powder;
1.5 to 13.8% of hydrosoluble binder;
0 to 13.2% of surfactant;
0 to 14.4% of conducting carbon black; and
40 to 70% of homogeneization liquid.

This paste is prepared by previously dissolving the hydrosoluble binder in the homogeneization liquid; then there are added in this order the surfactant, the hydroexpansible polymer, the other possible charges such as conducting carbon black. In any case, the viscosity of the coating paste of the invention is adjusted as a function of the nature of the binder used so that the coating is easy to carry out and so that the coating layer obtained is even and adheres well to the support.

As was mentioned above, the composite material of the invention may have various applications.

Thus, it may be used as water and physiological liquid absorbent, particularly in the medical or surgical fields or in the field of sanitary products such as disposable diapers or nappies etc.

It may also be used in agriculture as germination activator for maintaining the water at the position where the seeds are disposed; such precise localization is particularly advantageous when the water is enriched with growth promoting substances such as nutritive substances. In addition, substances such as anticryptogamic compounds, fungicides, fertilizers may be readily incorporated in the composite material at the time of coating.

The composite material of the invention may also be used for transplanting young shoots. They are packed with their clod of earth in the composite material and may, after soaking in water, be transplanted without risk.

As mentioned above, another important application of the composite material of the invention is its use in cables for ensuring the longitudinal sealing thereof.

Referring to FIGS. 1 and 2 of the accompanying drawings, it will be described hereafter how the composite material of the invention behaves when it is incorporated in the sheath of a cable, in the presence of water passing accidentally through the external casing of the cable.

The composite material of the invention 1 formed of a water permeable support 11 and a coating formed essentially of a hydroexpansible polymer and a hydrosoluble binder 12 is placed between the external casing 2 and the core, or more generally the internal sheath 3, of the cable. The parts 2 and 3 of the cable separate from each other to a greater or lesser degree during use of the cable (FIG. 1).

If water penetrates accidentally into the cable (FIG. 2), through the casing 2 and passes through the support 11 of the composite material, it dissolves the hydrosoluble binder in the vicinity of the place where it penetrated into the cable. The hydroexpansible polymer which was fixed to the support by the dissolved binder is detached from the support and tends to move while gelling so as to form, about the zone of penetration of the water, a pad 13 which prevents the propagation of water.

The hydroexpansible polymer which is no longer coated with the binder may develop all its swelling capacity and its quantity may be reduced with respect to the prior art for it is totally efficient and there is an over-accumulation thereof in the vicinity of the accidental infiltration zone.

It goes without saying that this description is given solely by way of illustration and that in particular other arrangements could be provided inside the cable without departing from the scope of the invention.

FIG. 3 and 4 show what happens in the case of using the composites of the prior art such as defined above.

The composite material 4 is formed of a hydroexpansible polymer layer 41 coated with a thermoplastic substance, not soluble in water and "sandwiched" between two layers of nonwonen material 42 and 43. When water penetrates accidentally into the cable, the hydroexpansible polymer swells where the water has penetrated, without being detached from the supports; it forms a "blister" 44 just at this level, but cannot form a pad about this zone.

The protection conferred is therefore less efficient than with the invention and especially since this polymer cannot develop all its swelling capacity, particularly because of the maintained presence of the thermoplastic binder, it is necessary to use a larger quantity thereof.

The following examples of formulation of coating compositions and of manufacture or preparation of the composite of the invention are given by way of illustration and are in no wise limiting.

EXAMPLE 1: coating paste

| Components: | Parts by weight |
| --- | --- |
| Hydroexpansible polymer AQUALIC CA of JAP. CAT. CHEMICAL | 100 |
| Hydrosoluble binders | |
| Polivinylpyrrolidone K 30 of GAF | 12 |
| Hydroxypropylcellulose KLUCEL M of HERCULES | 3 |
| Surfactant LEOPHEN RA of BASF | 10 |
| Conducting carbon black VULCAN PF of CABOT | 5 |
| Homogeneization liquid METHANOL | 150 |

This paste is prepared by mixing the components in the above order.

EXAMPLE 2: coating paste

| Components: | Parts by weight |
| --- | --- |
| Hydroexpansible polymer WATERLOCK J550 of GRAIN PROCESSING | 100 |
| Hydrosoluble binder: Hydroxypropylcellulose polymer KLUCEL of HERCULES | 20 |
| Surfactant ANTI TERRA U of BYK MALLINCKRODT | 10 |
| Methanol | 100 |

EXAMPLE 3: Preparation of a composite material according to the invention

The support used is a nonwoven material made from polyester fibers and a binder SBR. The fibers are oriented preferably in parallel.

The paste is formed as in example 1 either in an adapted crusher, or in a mixer, depending on the grain size of the chosen powder, so as to obtain a stable mixture. It required, the binder is enriched with conducting carbon black so that surface resistances are obtained of the order of 1500 to 3000 ohms/cm$^2$.

This mixture is coated by means of a roller scraper system. The deposit is adjusted to 78 g/m$^2$ so as to obtain, after drying in the oven, 60 g/m$^2$ of hydroexpansible polymer.

Thus a composite material is obtained having a fine layer of functional synthetic polymer, cross-linked and hydrophilic, deposited on a nonwoven support. This deposition is characterized by encapsulation of the absorbant polymer.

In the case of contact with water, the encapsulation disappears and uncovers the hydrophilic sites of the polymer. The result is compact and rapid swelling. At the same time, the super-absorbent polymer becomes detached from the nonwoven support. This movement of the gel is oriented towards the preferential zones through which the water passes, ensuring an excellent in situ efficiency.

Another advantage of the encapsulation resides in the fact that the ribbon better resists storage atmospheres with high relative humidity.

Tests carried out in situ

EXAMPLE 4: High tension cable incorporating the composite material manufactured according to example 3

It is a 36 KV cable. The test was carried out over 3 m of cable with peripheral perforation in the middle, baring the ribbon which is laid longitudinally between the lead and the extruded semiconductor, with the coating towards the outside.

This cable was subjected to different cycles each corresponding to being live for six hours at the temperature of 90° C. then, after cooling, at the ambient temperature during six hours, that is a total of 12 hours.

Test carried out
6 cycles (72 h) without water
28 cycles (336 h) with running water under a pressure of about 8.10$^3$ Pa (800 mm of water).
Result
Penetration of water on each side of the perforation: 14 to 22 cm

EXAMPLE 5: cable for telephony incorporating the composite material of example 3

It is a cable with "20 pairs 6/10". The test was carried out over 1m of cable. The ribbon was laid longitudinally after deposition of petroleum jelly and application of a polyester film, with the coating towards the outside.

Test carried out
Running water was applied to one end for 2 months.
Result
The propagation of the water was on average of 10 cm (15 cm at most).

To sum up, the invention enables to obtain more particularly:

an extensive in situ efficiency,
an even and smooth thickness,
cutting up into strips to about 5 mm,
the provision, under water, of a compact gel,
the accumulation of gel at the preferential positions where water passes,
the formation of a hydroblocking gel, not limited by a temperature rise or drop,
protection of the hydrophilic substance by encapsulation, during storage.

We claim:

1. A composite material for use as sealing agent in cables, including essentially a flat solid support having on at least one of its faces a coating with a high proportion of a hydroexpansible polymer powder, wherein the hydroexpansible polymer powder is fixed to the support by means of a hydrosoluble binder and the coating is essentially formed of:
   95 to 55% by weight of hydroexpansible polymer powder;
   5 to 23% by weight of hydrosoluble binder; and
   surfactant in a positive amount of up to 22% by weight.

2. A composite material according to claim 1, wherein the support is flexible.

3. A composite material according to claim 2, wherein the support is made of a nonwoven material.

4. A composite material according to claim 1, wherein the hydroexpansible polymer is chosen from modified acrylic polymers, grafted starches, polyacrylamides, carboxymethyl cellulose and its derivatives.

5. A composite material according to claim 1, wherein the hydroexpansible material is a super-absorbent.

6. A composite material according to claim 1, wherein the hydrosoluble binder is chosen from polyvinylpyrrolidones and their copolymers, and hydroxypropylcelluloses.

7. A composite material according to claim 1, wherein the surfactant is an anionic or non ionic surfactant.

8. A composite material for use as sealing agent in electric cables for transporting medium and high tension energy, including essentially a flat solid support having on at least one of its faces a coating with a high proportion of a hydroexpansible polymer powder, wherein the hydroexpansible polymer powder is fixed to the support by means of a hydrosoluble binder and the coating is essentially formed of:
   95 to 55% by weight of hydroexpansible polymer powder;
   5 to 23% by weight of hydrosoluble binder;
   0 to 22% by weight of surfactant; and
   2 to 8 g/m$^2$ of conducting carbon black.

9. A composite material according to claim 8, wherein the support is flexible.

10. A composite material according to claim 9, wherein the support is made of a nonwoven material.

11. A composite material according to claim 8, wherein the hydroexpansible polymer is chosen from modified acrylic polymers, grafted starches, polyacrylamides, carboxymethyl cellulose and its derivatives.

12. A composite material according to claim 8, wherein the hydroexpansible material is a super-absorbent.

13. A composite material according to claim 8, wherein the hydrosoluble binder is chosen from polyvinylpyrrolidones and their copolymers, and hydroxypropylcelluloses.

14. A composite material according to claim 8, wherein the surfactant is an anionic or non ionic surfactant.

15. A method for the manufacture of the composite material according to claim 8 which essentially consists of coating the support on at least one of its faces with a paste incorporating the chosen hydroexpansible polymer powder, hydrosoluble binder, surfactant and conductive carbon black in the proportions contemplated for the coating, homogeneized by means of a liquid other than water and then evaporating the liquid.

16. A method according to claim 15, wherein the homogeneization liquid is a light alcohol.

17. A method according to claim 16, wherein the homogeneization liquid is methanol or ethanol.

18. A coating paste for implementing the method of claim 15, which essentially includes, by weight:
   57 to 16.5% of hydroexpansible polymer powder;
   1.5 to 13.8% of hydrosoluble binder;
   0 to 13.2% of surfactant;
   conducting carbon black in a positive amount up to 14.4%; and
   40 to 70% of homogeneization liquid.

19. A composite material for use as sealing agent in cables, including essentially a flat solid support having on at least one of its faces a coating with a high proportion of a hydroexpansible polymer powder, wherein the hydroexpansible polymer powder is fixed to the support by means of a hydrosoluble binder solid in of itself and the coating is essentially formed of:
   95 to 55% by weight of hydroexpansible polymer powder;
   5 to 23% by weight of solid hydrosoluble binder; and
   0 to 22% by weight of surfactant.

20. A composite material according to claim 19, wherein the support is flexible.

21. A composite material according to claim 20, wherein the support is made of a nonwoven material.

22. A composite material according to claim 19, wherein the hydroexpanisble polymer is chosen from modified acrylic polymers, grafted starches, polyacrylamides, carboxymethyl cellulose and its derivatives.

23. A composite material according to claim 19, wherein the hydroexpansible material is super-absorbent.

24. A composite material according to claim 19, wherein the hydrosoluble binder is chosen from polyvinylpyrrolidones and their copolymers, and hydroxypropylcelluloses.

25. A composite material according to claim 19, wherein the surfactant is an anionic or non ionic surfactant.

26. A method for the manufacturer of a composite material for use as a sealing agent in cables comprising coating on at least one surface of an essentially flat solid support with a paste homogenized by a liquid other than water, and evaporating said liquid to provide a coating on at least one surface of said support, said coating comprising hydroexpansible polymer powder in an amount of 95 to 55% by weight, hydrosoluble binder in an amount of 5 to 23% by weight, and surfactant in an amount of 0 to 22% by weight.

27. A method according to claim 26 wherein said liquid comprises a light alcohol.

* * * * *